(12) United States Patent
Dank et al.

(10) Patent No.: US 8,413,498 B2
(45) Date of Patent: Apr. 9, 2013

(54) TIRE TEST SYSTEM

(75) Inventors: Matthias Dank, Graz (AT); Johann Eitzinger, Graz (AT); Michael Resl, Graz (AT)

(73) Assignee: AVL List GmbH, Graz (AT)

( * ) Notice: Subject to any disclaimer, the term of this patent is extended or adjusted under 35 U.S.C. 154(b) by 398 days.

(21) Appl. No.: 12/805,951

(22) Filed: Aug. 25, 2010

(65) Prior Publication Data

US 2011/0048120 A1  Mar. 3, 2011

(30) Foreign Application Priority Data

Aug. 27, 2009 (AT) .................................. 537/2009

(51) Int. Cl.
*G01M 17/02* (2006.01)

(52) U.S. Cl.
USPC ............................................................. 73/146

(58) Field of Classification Search ........................ None
See application file for complete search history.

(56) References Cited

U.S. PATENT DOCUMENTS

| | | | | |
|---|---|---|---|---|
| 2,092,381 | A * | 9/1937 | Stewart ........................... | 105/61 |
| 3,498,122 | A * | 3/1970 | Odier et al. ................. | 73/116.06 |
| 4,502,327 | A * | 3/1985 | Scrivener et al. .............. | 73/146 |
| 4,542,648 | A * | 9/1985 | Vinegar et al. ............. | 73/152.07 |
| 7,254,896 | B2 * | 8/2007 | Carr et al. ....................... | 33/338 |
| 7,877,216 | B2 * | 1/2011 | Wright et al. ................... | 702/34 |
| 2010/0030490 | A1 * | 2/2010 | Wright et al. ................... | 702/34 |
| 2011/0130862 | A1 * | 6/2011 | Gao et al. ...................... | 700/213 |

FOREIGN PATENT DOCUMENTS

| | | |
|---|---|---|
| DE | 102006026436 | 12/2007 |
| JP | 57110934 | 7/1982 |
| JP | 7318460 | 12/1995 |
| JP | 2003269948 | 9/2003 |
| JP | 2005265748 | 9/2005 |
| JP | 2006038776 | 2/2006 |
| JP | 2008175757 | 7/2008 |
| SU | 771497 | 10/1980 |
| SU | 819609 | 4/1981 |

OTHER PUBLICATIONS

English Abstract of JP 2005265748.
English Abstract of JP 2008175757.
English Abstract of JP 2006038776.
English Abstract of JP 7318460.
English Abstract of JP 57110934.
English Abstract of JP 2003269948.

\* cited by examiner

*Primary Examiner* — Lisa Caputo
*Assistant Examiner* — Jermaine Jenkins
(74) *Attorney, Agent, or Firm* — Dykema Gossett PLLC

(57) ABSTRACT

A tire test system for tire tests under the most realistic conditions possible, however, including the possibility of widely-varied, simple and precisely reproducible parameters includes a track (6) contactable by at least one tire, as well as a positive guide (5) following this track, for example, in the form of at least one rail. In addition, a test trolley (2) is provided that is guided by a positive guide (5) and is autonomously driven and/or brakable independently of the tire(s), on which trolley at least one tire (1) is mountable, and which has equipment for driving and/or braking autonomously and independently of the test trolley (2).

6 Claims, 1 Drawing Sheet

TIRE TEST SYSTEM

Figure 1:
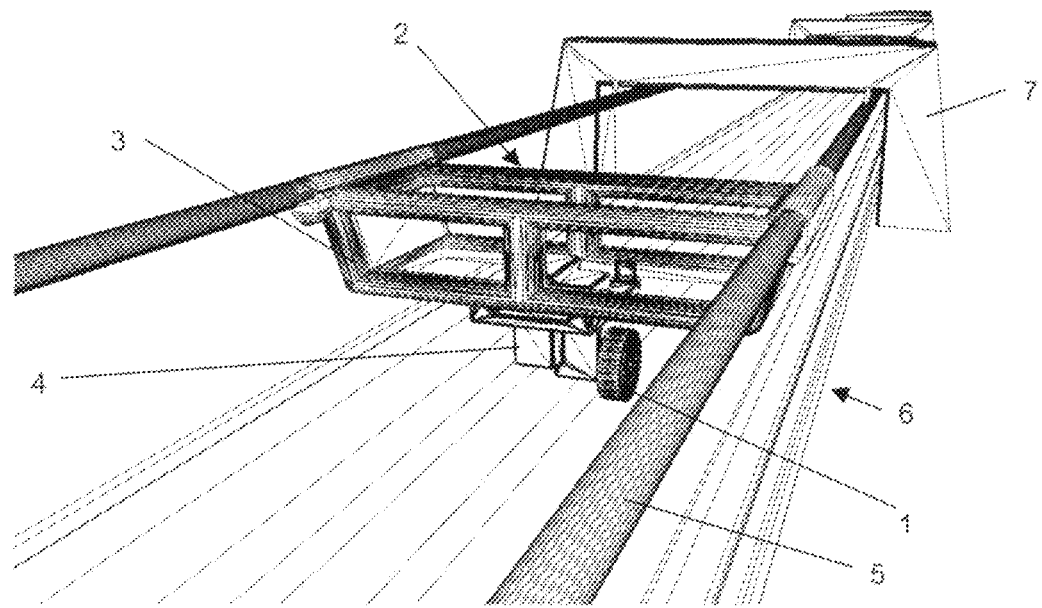

The invention relates to a tire test system composed of a track contactable by at least one tire and a positive guide following one of these tracks, for example, in the form of at least one rail.

Various systems have been proposed previously for the purpose of testing the properties of vehicle tires. Thus, the conventional approach for a stationary testing operation is to have the tire contact a roller or a belt that is drivable by controllable equipment, thereby allowing the properties of the tire to be tested when rolling. However, neither the belt nor the roller can in any way be compared with the actual surfaces on which the tire is used on a vehicle according to its intended purpose. The test runs are also constrained by the inertia of the equipment.

Tire tests on real roadways are possible, for example, by mounting the tires on truck trailers or special tire test trailers. However, these tests are constrained by being bound to the specification for the truck or the towing vehicle in terms of the overall parameters and moreover do not allow the ground surface to be changed during the test run, or the surface condition to be changed on which the tire is to be tested. For example, DE 102006026436 A1 describes a tire test using a test vehicle moving over a real road.

A common feature of all of the test procedures using test vehicles driven over real roads is that the parameters affecting the tire itself, that is, its vertical load, camber, toe-in, and the like essentially cannot be modified, or can be modified only using costly means, and that it is difficult to maintain at a constant level and then reproduce appropriate settings or modifications.

SU 771497 B discloses a test course in the form of a lemniscate of Bernoulli (Cassini oval) comprising a guide rail that has appropriate sections in the intersection region, while SU 819609 deals with a straight test course for tire wear measurements subject to lateral transverse forces. Here a test vehicle is fixed in position on the guide rail at a given angle relative to the axis of the test course and moves, propelled by a vehicle drive system, from one end of the course to the other, the control unit of the test system switching the vehicle when the vehicle contacts a stop. The characteristic feature of both test courses is the fact that the test vehicle is connected by, e.g., a roller to the test guide rail or a guide track provided on the test course so as to maintain identical test conditions for the various test tires.

The problem to be solved by this invention was thus to provide a tire test system in which tire tests are possible under conditions as close to reality as possible yet given varying parameters that can be reproduced simply and precisely.

To solve this problem, a tire test system is provided that is characterized by a test trolley that is guided by the positive guide and is autonomously driven and/or brakable independently of the tire(s), on which trolley at least one tire is mountable and which has equipment for driving and/or braking autonomously and independently of the test trolley. Through the autonomous test trolley, more widely varying effects can be imposed on the tire itself as well as by the test vehicle so as to produce the most different loads and geometries possible. As a result, meaningful and reproducible tire tests can be performed without constraints on the testable parameters and limiting conditions. The action of the autonomous braking and drive unit independent of the test vehicle provides a higher level of flexibility in the conditions for test runs and enables, for example, realistic acceleration and braking processes to be integrated in the test run.

In an especially advantageous way, another embodiment of the tire test system according to the invention is characterized in that the test trolley is drivable and/or brakable through the tire, and that the test trolley applies a corresponding force so as to affect the speed of the trolley. The drive/braking unit on the trolley thus essentially presents an opposing force to the drive/braking unit at the wheel. In this way the trolley "simulates" the vehicle and is able to compensate its own mass which is higher than that of a real vehicle. As a result, in addition to simple maneuvers complex maneuvers are also possible, such as starting up on a hill on snow as well as ABS braking operations.

In order to be able to test the tires on various pavements without great expense, in an advantageous embodiment of the invention a track is provided that has regions of varying surface conditions. To this end, provision is advantageously made whereby the track is subdivided longitudinally into multiple adjacent regions of different surface structures.

In order to be able without great expense to test one and the same tire on different pavements of the roadway, provision is advantageously made whereby the test trolley at the positive guide, or a mounting structure for the tire, is adjustable relative to the test trolley and/or the track.

If furthermore the tire test system has equipment to generate different surfaces conditions for the track—for example, rain-generating equipment—tire tests can be performed easily and optimally for different surface conditions of the roadway without being dependent on external influencing factors.

The following discussion will describe the invention in more detail with reference to the attached figures of the drawing.

Figure 2:
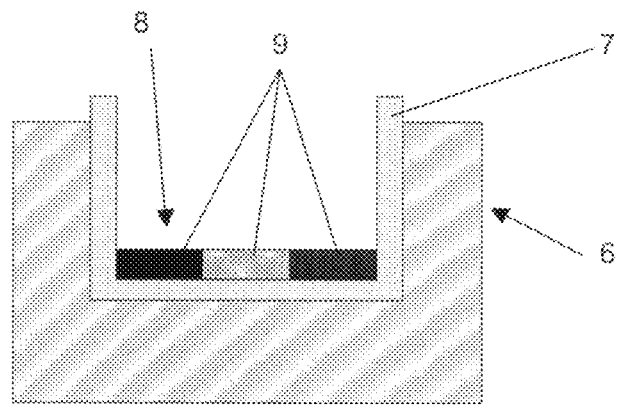
Figure 3:
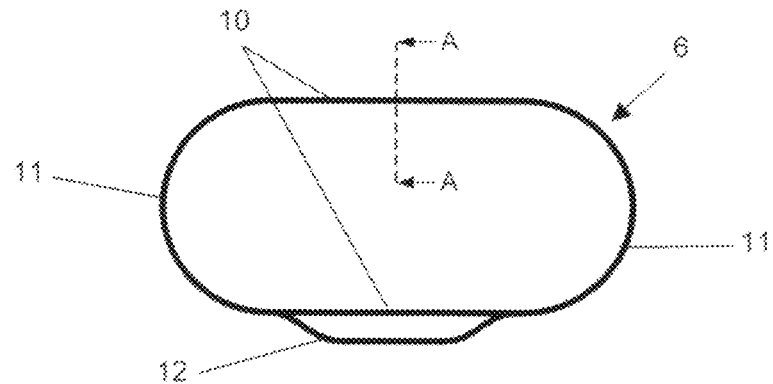

FIG. 1 here is a perspective view of a section of a tire test system according to the invention in which a test trolley is located;

FIG. 2 shows a schematic cross-section of the track of a tire test system according to the invention; and FIG. 3 is a schematic top view of an example of a design for a tire test system according to the invention.

In the exemplary embodiment of a tire test system according to the invention of FIG. 1, a tire 1 to be tested is mounted on an autonomously driven, and also brakable, test trolley 2. This test trolley 2 is composed of a base or supporting structure 3 and a mounting structure 4 for the tire, which structure is preferably adjustable, either manually or also automatically, relative to base structure 3—in particular, transversely to the direction of travel. In the example shown, base structure 3 of test trolley 2 is suspended and guided on two rails 5 that form a positive guide for test trolley 2. These rails 5 are located vertically above and transversely somewhat offset relative to track 6 contacted by the tire, and are suspended on quasi-perforated support structures 7 that rest on the ground laterally along track 6. Other types of positive guides are of course also conceivable, as are other relative positionings vis-à-vis test trolley 2 or track 6.

As is clearly seen in FIG. 2, which represents a cross-section along line A-A of FIG. 3, track 6 is composed of foundation 7 sunk into the ground and the pavement 8 that is actually contacted by the tire to be tested. In the case illustrated here, this pavement 8 is composed of three segments of different structure that are disposed in adjacent fashion in the longitudinal direction of the track and thus have different surface conditions. Tire 1 can be brought into contact with each one of the different pavement types 9 by appropriately mounting the tire on test trolley 2, or transversely adjusting test trolley 2 or the mounting structure for tire 1.

A design of track 6 in an enclosed form is especially advantageous for longer-term test runs over great distances. For example, the design illustrated in FIG. 3 could be selected in which two straight and parallel track segments 10 are interconnected by essentially semicircular curved track segments 11 to form a closed essentially oval test course. One track segment, which leads to a setup and maintenance area 12, advantageously branches off from one straight track segment 10.

Equipment can be provided, either distributed along the entire length of track 6 or also only at specified sites, by which equipment the surface conditions of the track segments and of individual surface regions 9 can be modified. For example, rain-generating systems, snow-generating systems, systems for introducing sand, gravel, or the like can be provided. Track 6 can also be equipped with cooling equipment so as to enable tire tests to be performed on an icy roadway. For additional, especially realistic tire tests, structures can also be provided on which different obstacles are attached. If necessary, track 6 can also be appropriately implemented right from the beginning and include uneven surfaces, longitudinal and/or transverse steps and the like.

Preferably, the widest possible variety of measurement equipment and sensors are mounted in distributed fashion along track 6 or on test trolley 2, which equipment/sensors can include, among others, high-speed cameras, stereo cameras, or analogous optical measuring equipment, as well as acoustic measuring equipment.

Appropriately modified test trolleys 2 can be employed for different tire tests, while it is also possible to utilize test trolleys 2 that are adjustable or adaptable within a certain range. Especially advantageous are test trolleys 2 that have drive and/or braking equipment for tire 1, which equipment operates autonomously and independently of the drive or braking system of test trolley 2 per se, thereby enabling realistic braking operations to be integrated into the tire test run. Test trolley 2, however, can also be drivable and/or brakable solely through tire 1. Test trolley 2 can thus apply a definable force so as to affect the speed of test trolley 2. A controllable or programmable drive/braking unit on test trolley 2 can thus generate an opposing force to the drive/braking unit on tire 1. In this way, the test trolley "simulates" the vehicle on which tested tire 1 is normally used and in so doing compensates its own mass, which is higher than that of a real vehicle, through this integrated drive unit. As a result, in addition to simple maneuvers even relatively complex maneuvers are possible, such as starting up on snow on a hill and also ABS braking operations.

The invention claimed is:

1. A tire test system, composed of a track (6) contactable by at least one tire and of a positive guide (5) following this track, for example, in the form of at least one rail, and a test trolley (2) that is guided by the positive guide (5) and is driven and/or brakable autonomously independently of the tire(s), on which trolley at least one tire (1) is mountable and which as equipment for driving and braking autonomously and independently of the test trolley (2).

2. The tire test system according to claim 1, wherein the tire (1) is drivable and/or brakable through the test trolley (2), and the test trolley (2) applies a corresponding force so as to affect the speed of the trolley.

3. The tire test system according to claim 1, wherein said track (6) includes regions of different surface conditions.

4. The tire test system according to claim 3, wherein the track (6) is longitudinally subdivided into multiple, adjacent regions (99) with different surface conditions.

5. The tire test system according to claim 1, wherein the test trolley (2) is adjustable at the positive guide (5), or a mounting structure (4) for the tire (1) is adjustable on the test trolley (2) relative to the test trolley and/or to the track (6).

6. The tire test system according to claim 1, including equipment to generate different surface conditions in the track (6), for example, a rain-generating system.

* * * * *